[19] United States Patent
Blatchley et al.

[11] Patent Number: 5,495,368
[45] Date of Patent: Feb. 27, 1996

[54] METHOD OF TRACKING THRESHOLDS ON A READ SIGNAL

[75] Inventors: Michael A. Blatchley; Charlie M. Monroe, Jr., both of Longmont; Harlan Mathews, Boulder, all of Colo.

[73] Assignee: Maxtor Corporation, Longmont, Colo.

[21] Appl. No.: 58,288

[22] Filed: May 4, 1993

[51] Int. Cl.$^6$ ........................................... G11B 5/09
[52] U.S. Cl. ................................... 360/46; 360/51
[58] Field of Search ........................ 360/31, 51, 45, 360/46, 53, 67; 375/99, 101; 307/351

[56] References Cited

U.S. PATENT DOCUMENTS

| | | | |
|---|---|---|---|
| 3,691,543 | 9/1972 | Mueller | 340/174.1 B |
| 3,801,830 | 4/1974 | Boyer | 307/235 R |
| 4,169,232 | 9/1979 | Henrich | 307/364 |
| 4,634,896 | 1/1987 | Shrinkle | 307/351 |
| 4,635,142 | 1/1987 | Haugland | 360/46 |
| 4,771,188 | 9/1988 | Cheng et al. | 307/351 |
| 4,789,838 | 12/1988 | Cheng | 328/150 |
| 5,150,050 | 9/1992 | Genheimer et al. | 360/31 X |

*Primary Examiner*—Donald T. Hajec
*Assistant Examiner*—Thien Minh Le
*Attorney, Agent, or Firm*—Sheridan Ross and McIntosh

[57] ABSTRACT

A pulse detection sensing system which provides an output signal only when a maximum voltage peak is detected. The system has a comparator which generates a comparator output signal when an output signal generated by the transducer of the system is equal to or greater than a threshold signal. The comparator is coupled to a peak follower and a sample/hold circuit which increases the voltage of the threshold signal to the level of the head output signal when the output signal attains a zero slope and has equaled or exceeded the set threshold value.

13 Claims, 2 Drawing Sheets

METHOD OF TRACKING THRESHOLDS ON A READ SIGNAL

FIELD OF THE INVENTION

The present invention relates to a system for detecting the maximum peak voltage of a signal generated from a magnetic disk.

DESCRIPTION OF RELATED ART

Hard disk drives contain a magnetic disk(s) which stores information in a binary format. The binary bits are differentiated by the polarity of the magnetic disk. For example, a binary 0 can be represented by a segment of the disk which has a first polarity and a binary 1 can be represented by a segment of the disk which has a second opposite polarity.

The disk drive contains a magnetic head which senses the magnetic field of the disk as the disk is rotating relative to the head. The head generates a analog signal which has a voltage that corresponds to the strength and polarity of the magnetic field of the disk. In a typical disk drive system, the output signal of the magnetic head is provided to a comparator which compares the output signal to a preset threshold signal. The drive also contains a differentiator which monitors the slope of the signal. If the output signal has reached a zero slope and is equal to or greater than the threshold signal, a circuit generates a signal which corresponds to a bit of information.

Occasionally the system will generate electrical noise that has a voltage level which is greater than the threshold signal provided to the comparator. The existence of electrical noise can cause the comparator and differentiator to generate a false signal, thereby creating an error in the data stream. Such electrical noise can be caused by a defect in the magnetic head, signal ringing or a misalignment between the head and the track of the disk. The generation of false signals due to noise is further aggravated by fluctuations in the baseline level of the head output signal. Increases in the baseline output signal could cause even the smallest noise spike to generate a false bit signal. It would therefore be desirable to have a system which would generate a data bit only when a maximum peak value is sensed by the magnetic head, and disregard any ancillary voltage peaks in the output signal of the magnetic head.

SUMMARY OF THE INVENTION

The present invention is a system and method for generating an output signal when a maximum peak voltage is detected from a magnetic disk. The system includes a magnetic head which senses the magnetic field of a magnetic disk and provides an output signal that corresponds to the strength and polarity of the magnetic field. The output signal is compared to a threshold signal by a comparator which provides a comparator output signal if the head output signal is/equal to or greater than the threshold signal.

The system also has a differentiator which provides a slope output signal when the slope of the input signal is essentially zero. The generation of the slope output signal is ANDed with the comparator output signal to enable a sample/hold circuit. When enabled, the sample/hold circuit charges up to the voltage level of the head output signal. The charged sample/hold circuit establishes the head output signal as the new threshold value. Subsequent head output signals are compared to the new threshold value. If the subsequent head output signals are greater than the new threshold value, another comparator output signal is generated and the threshold value is increased to the voltage level of the subsequent head output signal when the subsequent output signal reaches a peak value.

The system also has a post-qualifier circuit that contains retriggerable timers. The timers are triggered every time a corresponding comparator generates an output signal and a signal peak occurs. The post-qualifier circuit generates an output signal after the timer has been triggered and expired. The output signal of the post-qualifier circuit corresponds to a data bit. The system has companion circuitry to detect both positive and negative maximum voltage peaks. The system will generate an output signal only when a maximum voltage peak is detected. Signals will not be generated for other voltages peaks, even if such peaks exceed the initial threshold voltage level.

Therefore it is an object of the present invention to provide a system for sensing the magnetic field of a magnetic disk and generating an output signal .only when a maximum voltage peak has been detected.

It is also an object of the present invention to provide a hard disk drive magnetic sensing system that will not generate false signals in response to noise created in the system.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
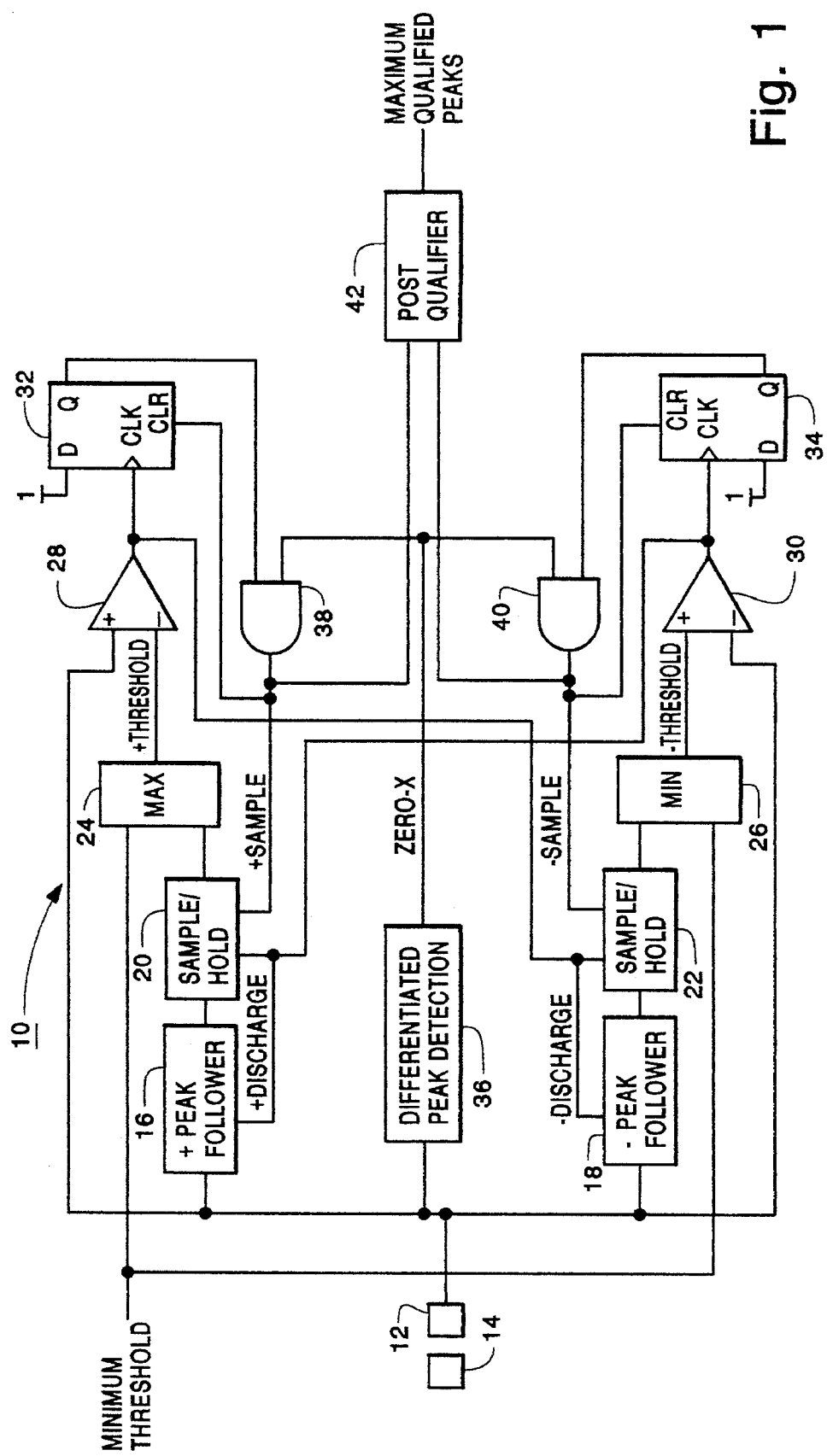
FIG. 1 is a schematic of a system that generates an output signal when a maximum peak voltage is detected from a magnetic disk.

Referring to the drawings more particularly by reference numbers, FIG. 1 shows a system 10 of the present invention. The system 10 is used to generate an output signal when a maximum voltage peak is detected. The system 10 includes a magnetic head 12 which can sense the magnetic field of a magnetic disk 14. The magnetic head 12 generates an analog output signal which corresponds to the strength and polarity of the magnetic field of the disk 14. Although a magnetic disk is described, it is to be understood that the present invention can be used with other storage media such as magnetic tape and optical disk.

The magnetic head 12 is connected to a positive peak follower 16 and a negative peak follower 18. The peak followers contain capacitors which are charged to the voltage value of the head output signal provided by the head 12 when the voltage of the signal increases. The peak followers 16 and 18 are connected to positive 20 and negative 22 sample/hold circuits, respectively. The sample/hold circuits 20 and 22 are coupled to maximum 24 and minimum 26 threshold circuits that provide threshold signals to positive comparator 28 and negative comparator 30, respectively. The other input of each comparator 28 and 30, is connected to the output signal of the magnetic head 12.

If the head output signal is equal to or greater than the threshold signal provided by the maximum threshold circuit 24, the positive comparator 28 generates a comparator output signal. The comparator 28 is connected to the clock pin CLK of a first latch 32, which is SET when the comparator 28 generates the comparator output signal. Likewise, the negative comparator 30 is connected to the clock pin CLK of a second latch 34, which is SET when the negative comparator 30 generates a comparator output signal. The negative comparator 30 generates the output signal when the input signal from the magnetic head 12 is equal to or less than the threshold value provided by the minimum threshold circuit 26.

The magnetic head 12 is also connected to a peak detector 36 which monitors the output signal of the head 12 and generates a zero-x signal when the slope of the output signal has changed from a positive to a negative value, or a negative to a positive value.

The output of the peak detector 36 is connected to the inputs of a first AND gate 38 and a second AND gate 40. The other inputs of the AND gates are connected to the outputs of the latches 32 and 34. The output of the AND gates are connected to the sample/hold circuits 20 and 22. The output signal of the AND gate enables the sample/hold circuit so that the sample circuit charges to the voltage level stored in the peak follower. The stored voltage in the sample circuit is sent to the threshold circuit. The threshold circuit compares the stored voltage from the sample circuit with a minimum threshold voltage. The threshold circuit provides the signal (minimum threshold or stored sample) which has the higher absolute voltage value to the comparator as the threshold voltage. The output of the AND gates are also connected to the clear pins CLR of the latches. The ANDed output signal of the AND gates also clears the latches.

The output of the comparator 28 is also connected to the peak follower 18 and sample/hold 22 of the negative circuit. An output signal of the comparator causes the peak follower and sample/hold circuits to discharge. Likewise an output signal from the comparator 30 will cause the peak follower 16 and sample/hold circuit 20 of the positive circuit to also discharge.

The output of the AND gates 38 and 40 are connected to the inputs of a post-qualifier circuit 46. The post-qualifier circuit 46 contains retriggerable timer circuits. One of the timers corresponds to the positive voltage circuit and the other timer corresponds to the negative voltage circuit. The timers are reset each time a new AND gate output signal is provided from a corresponding AND gate 38 and 40. The post-qualifier circuit generates an output signal when either the positive or negative timer is triggered and then expires. The output signal of the post-qualifier circuit 46 corresponds to a data bit.

Figure 2:
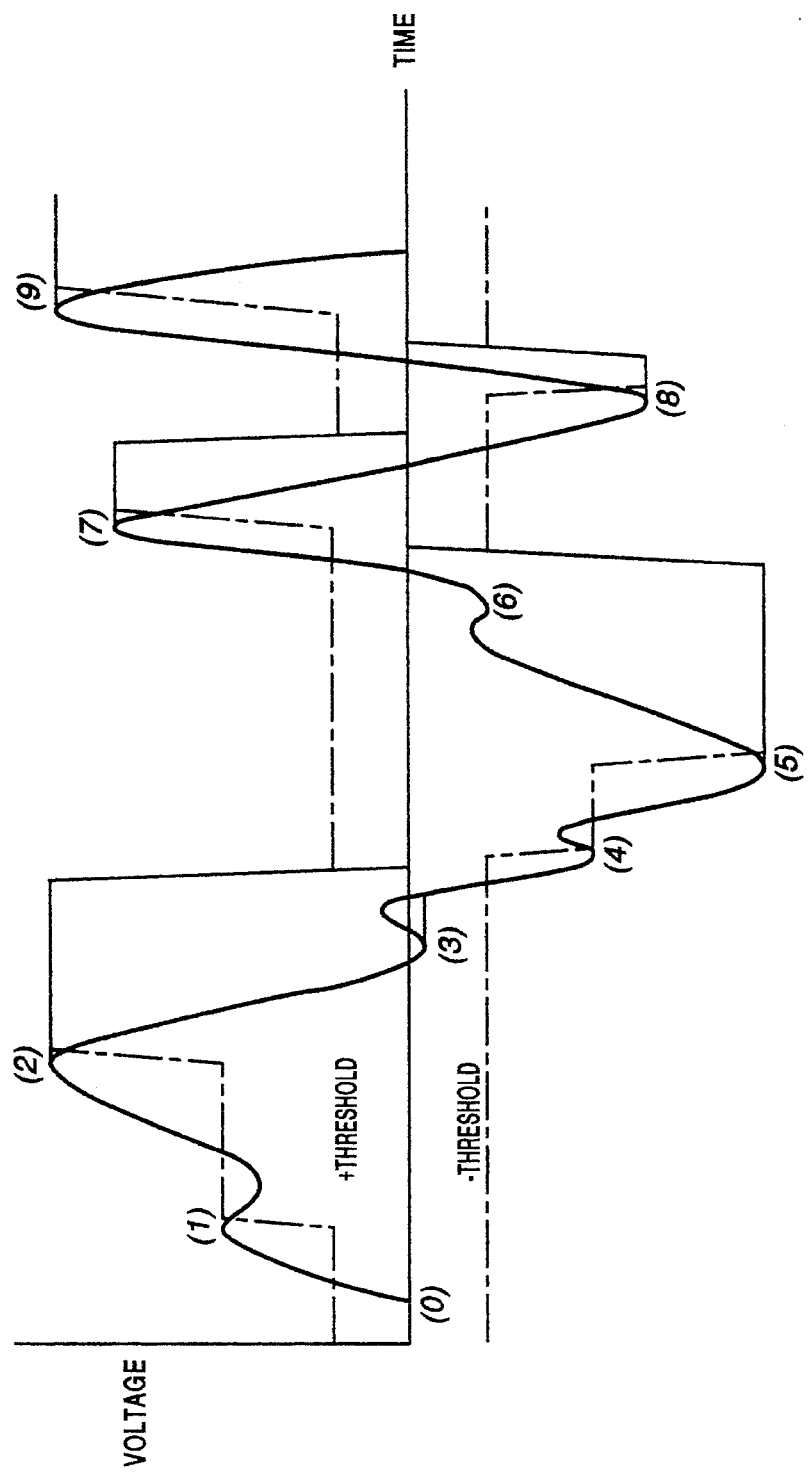
FIG. 2 is a graph showing the voltages of an output signal generated by a magnetic head which senses the magnetic field of a magnetic disk.

In operation, the magnetic head 12 senses the magnetic field of the disk 14 and generates an output signal. FIG. 2 shows the voltage of an head output signal generated by the magnetic head 12. The positive peak follower 16 charges as the voltage of the head output signal increases from point 0 toward point 1. When the output signal voltage exceeds the threshold value, the positive comparator 28 generates a comparator output signal. The comparator output signal causes the first latch 32 to SET and the negative peak follower 18 and negative sample/hold 22 to discharge. At this point the sample/hold circuit 20 is not charged because the peak detector 36 has not detected a zero slope. The second latch 34 is also not SET because the head output signal is not below the minimum threshold provided by the minimum threshold circuit 26.

The peak follower 16 continues to charge while the head output signal rises to point 1. At this point a zero slope is detected and the peak detector 36 provides an output signal to the first AND gate 38. The outputs of the first latch 32 and timing circuit 36 are ANDed and an output signal is provided to the positive sample/hold circuit 20. The sample/hold circuit 20 is charged to the level of the peak follower 16 which is the voltage level of the head output signal at point 1. The sample/hold circuit 20 provides the new threshold signal to the comparator 28 through the threshold circuit 24. The comparator compares all subsequent head output signals with the voltage level at point 1. The AND gate 38 output signal triggers the timer of the post-qualifier circuit 46. The AND gate output signal also clears the first latch 32.

When the head output signal exceeds the new threshold level established at point 1, the first latch 32 is again SET by the positive comparator 28. The differentiator continues to monitor the output signal until a zero slope is detected at point 2. The peak follower 16 continues to track the voltage level of the output signal and the threshold signal is re-established at the voltage level at point 2. The output signal of the AND gate again retriggers the timer of the post-qualifier circuit 46.

The head output signal decreases and then increases to point 3. Because the voltage value at point 3 does not exceed the threshold value established at point 2, the latch 32 is not SET and the AND gate 38 does not provide another output signal to retrigger the timer of the post-qualifier circuit. When the timer expires, the post-qualifier circuit 46 generates an output signal that corresponds to the maximum voltage peak at point 2.

The head output signal continues to decrease into the negative voltage range. When the output signal crosses the negative threshold, the comparator 30 provides an output signal which causes the positive peak follower 16 and sample/hold circuits 20 to discharge. The positive threshold value is then reset to the minimum value by the threshold circuit 24.

The process is repeated for the negative peaks. When the head output signal reaches point 4, the timer is triggered and the threshold value is lowered to the voltage level at point 4. The negative timer is retriggered when the signal reaches point 5. The post-qualifier circuit 46 generates an output signal corresponding to point 5 when the timer has expired. The point 6 is ignored because the voltage level is not below the threshold value established at point 5. The system generates similar output signals for points 7, 8 and 9.

As shown and described above, the system of the present invention generates outputs signals only when a maximum voltage peak has been detected. The system will not generate false output signals for other voltage peaks. For example, the system will not generate an output signal for the head output signal at points 1 and 4, which may be caused by noise in the system, or by points 3 and 6 which may be caused by signal ringing.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for detecting a maximum voltage of a signal generated from a storage device, comprising:

sensing means for sensing the storage device and providing a head output signal; and voltage peak means for comparing said head output signal with a threshold signal and changing said threshold signal to said head output signal only if an absolute value of said head output signal is greater than an absolute value of said threshold signal and a slope of said head output signal is essentially zero.

2. A system for detecting a maximum voltage of a signal generated from a storage device, comprising:

sensing means for sensing the storage device and providing a head output signal; and voltage peak means for comparing said head output signal with a threshold signal and changing said threshold signal to said head output signal if an absolute value of said head output signal is greater than said threshold signal;

wherein said voltage peak means includes threshold means for providing a voltage threshold signal;

wherein said voltage peak means includes comparator means for comparing said head output signal with said voltage threshold signal and providing a comparator output signal when said head output signal is no less than said voltage threshold signal;

wherein said voltage peak means includes timing circuit means for monitoring said head output signal and generating a timing output signal when a slope of said head output signal is essentially zero;

wherein said voltage peak means includes threshold update means for increasing said voltage threshold signal to said head output signal when said comparator means provides said comparator output signal and said timing circuit means provides said timing output signal.

3. A system for detecting a maximum voltage of a signal generated from a storage device, comprising:

sensing means for sensing the storage device and providing a head output signal; and voltage peak means for comparing said head output signal with a threshold signal and changing said threshold signal to said head output signal if an absolute value of said head output signal is greater than an absolute value of said threshold signal and said head output signal is substantially at a peak;

wherein said voltage peak means compares said head output signal with a positive threshold signal and a negative threshold signal, wherein said positive threshold signal is increased to said head output signal if said head output signal exceeds said positive threshold signal and decreases said negative threshold signal if said head output signal is less than said negative threshold signal.

4. The system as recited in claim 3, wherein said voltage peak means includes reset means for decreasing said voltage threshold signals to a minimum value when said head output signal crosses an opposite threshold signal.

5. The system as recited in claim 2, further comprising post-qualifier circuit means for providing an output signal when a timer is triggered and expired, said timer being triggered by said generation of said comparator output signal and said timing output signal.

6. A system for detecting a maximum voltage of a signal generated from a storage device, comprising:

sensing means for sensing the storage device and providing a head output signal;

timing circuit means for monitoring said head output signal and generating a timing output signal when a slope of said head output signal is essentially zero;

positive threshold means for providing a positive voltage threshold signal;

positive comparator means for comparing said head output signal with said positive voltage threshold signal and providing a positive comparator output signal when said head output signal is no less than said positive voltage threshold signal;

positive threshold update means for increasing said positive voltage threshold signal to said head output signal when said positive comparator means provides said positive comparator output signal and said timing circuit means provides said timing output signal;

negative threshold means for providing a negative voltage threshold signal;

negative comparator means for comparing said head output signal with said negative voltage threshold signal and providing a negative comparator output signal when said head output signal is no greater than said negative voltage threshold signal;

negative threshold update means for decreasing said negative voltage threshold signal to said head output signal when said negative comparator means provides said negative comparator output signal and said timing circuit means provides said timing output signal;

reset means for decreasing said positive voltage threshold signal to a positive minimum value when said head output signal crosses said negative threshold signal and for increasing said negative voltage threshold signal to a negative minimum value when said head output signal crosses said positive threshold signal; and, post-qualifier circuit means for providing an output signal when a timer is triggered and expired, said timer being triggered by said generation of said timing output signal and either said positive or negative output signals.

7. A method for detecting a maximum voltage of a signal generated from a storage device, comprising the steps of:

a) sensing the storage device and providing a plurality of head output signals;

b) comparing a first head output signal to a first threshold signal;

c) generating a first comparator output signal when said first head output signal is no less than said first threshold signal;

d) generating a timing output signal when said first head output signal has a slope that is essentially zero;

e) changing said first threshold signal to a second threshold signal which corresponds to said first head output signal, when said first comparator output signal and said timing output signal are generated.

8. The method as recited in claim 7, further comprising the steps of;

h) sensing when said head output signal crosses an opposite threshold signal;

i) decreasing said second threshold signal to said first threshold signal when said head output signal crosses said opposite threshold signal.

9. The method as recited in claim 8, further comprising the steps of;

f) triggering a timer when said first comparator output signal and said timing output signal are generated;

g) generating an output signal when said timer expires.

10. An apparatus for detecting qualified peaks of a raw data signal sensed from a storage device, comprising:

a transducer that generates a raw data signal;

a comparator that compares the raw data signal to a threshold signal; and, a threshold adjustment circuit that adjusts the threshold signal to the raw data signal only when the raw data signal exceeds an existing threshold signal and a slope of the raw data signal is essentially zero.

11. The apparatus as recited in claim 10, wherein said threshold adjustment circuit includes a sample/hold circuit that is connected to said transducer and adjust the threshold signal.

12. An apparatus for detecting qualified peaks of a raw data signal sensed from a storage device, comprising:

a transducer that generates a raw data signal;

a comparator that compares the raw data signal to a threshold signal;

a threshold adjustment circuit that adjusts the threshold signal to the raw data signal only when the raw data signal exceeds an existing threshold signal and is substantially at a peak; and a zero-crossing circuit that provides a zero output signal when the slope of the raw data signal crosses a zero amplitude.

13. The apparatus as recited in claim 12, further comprising a post-qualifier circuit which contains a timer that is triggered when said zero-crossing circuit provides the zero output signal and when said raw data signal exceeds an existing threshold signal, said post-qualifier circuit provides a qualified output signal when said timer times out.

* * * * *